US009398010B1

(12) United States Patent
Chickering et al.

(10) Patent No.: US 9,398,010 B1
(45) Date of Patent: *Jul. 19, 2016

(54) PROVISIONING LAYER TWO NETWORK ACCESS FOR MOBILE DEVICES

(71) Applicant: Pulse Secure LLC, San Jose, CA (US)

(72) Inventors: Roger A. Chickering, Granite Bay, CA (US); Jeffrey C. Venable, Sr., Union City, CA (US)

(73) Assignee: Pulse Secure LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/666,208

(22) Filed: Mar. 23, 2015

Related U.S. Application Data

(63) Continuation of application No. 13/166,376, filed on Jun. 22, 2011, now Pat. No. 8,990,891.

(60) Provisional application No. 61/477,063, filed on Apr. 19, 2011.

(51) Int. Cl.
*H04L 29/06* (2006.01)
*H04W 12/06* (2009.01)

(52) U.S. Cl.
CPC ........ *H04L 63/0876* (2013.01); *H04L 63/0884* (2013.01); *H04L 63/162* (2013.01); *H04L 63/164* (2013.01); *H04W 12/06* (2013.01); *H04L 63/0892* (2013.01)

(58) Field of Classification Search
CPC ............ H04L 63/0876; H04L 63/0892; H04L 63/164; H04L 63/162; H04L 63/0884
See application file for complete search history.

(56) References Cited

U.S. PATENT DOCUMENTS

| | | | |
|---|---|---|---|
| 6,304,901 B1 | 10/2001 | McCloghrie et al. | |
| 6,539,019 B1 | 3/2003 | Noy et al. | |
| 6,553,028 B1 | 4/2003 | Tang et al. | |
| 6,741,592 B1 | 5/2004 | Edsall et al. | |
| 6,804,233 B1 | 10/2004 | Congdon et al. | |
| 6,914,905 B1 | 7/2005 | Yip et al. | |
| 6,944,130 B1 | 9/2005 | Chu et al. | |
| 7,010,600 B1 | 3/2006 | Prasad et al. | |
| 7,143,435 B1 | 11/2006 | Droms et al. | |
| 7,420,979 B2 | 9/2008 | Nozue et al. | |
| 7,546,458 B1 | 6/2009 | Singla et al. | |
| 7,693,158 B1 | 4/2010 | Carrie | |
| 8,281,371 B1 * | 10/2012 | Chickering | ........... G06F 21/577 709/219 |

(Continued)

OTHER PUBLICATIONS

Juniper, "Junos Pulse Access Control Service: Guide to IF-MAP Federation," Juniper Networks, Published Jan. 20, 2011.*
TCG, "TNC Everywhere, Pervasive Security," Trusted Group Computing, Interop Las Vegas 2009, Accessed Apr. 30, 2013, Online: [http://www.trustedcomputinggroup.org/files/static_page_files/526A7C52-1 D09-3519-AD5FDADD58C379D7/TNC%20Pervasive%20Secu rity_Presentation_May18_2009.pdf].*
TCG, "Federated TNC," Trusted Computing Group, Revision 26, Published May 18, 2009.*

(Continued)

*Primary Examiner* — Robert Leung
(74) *Attorney, Agent, or Firm* — Shumaker & Sieffert, P.A.

(57) ABSTRACT

In general, techniques are described for provisioning layer two access in computer networks. A network device located in a public network comprising an interface and a control unit may implement the techniques. The interface establishes a session with a mobile device. The control unit requests security state data identifying a security state of the mobile device via the established session. The interface receives a mobile device identifier and the security state data from the mobile device via the session. The mobile device identifier identifies the mobile device. The control unit publishes the security state information to a database such that the security state information is associated with the mobile device identifier.

22 Claims, 7 Drawing Sheets

(56) References Cited

U.S. PATENT DOCUMENTS

| | | |
|---|---|---|
| 8,291,468 B1 | 10/2012 | Chickering |
| 8,966,075 B1 | 2/2015 | Chickering et al. |
| 8,990,891 B1 | 3/2015 | Chickering et al. |
| 2001/0019554 A1 | 9/2001 | Nomura et al. |
| 2005/0071446 A1 | 3/2005 | Graham et al. |
| 2005/0111455 A1 | 5/2005 | Nozue et al. |
| 2005/0114507 A1 | 5/2005 | Tarui et al. |
| 2005/0163078 A1* | 7/2005 | Oba ............ H04W 12/06 370/331 |
| 2005/0210288 A1* | 9/2005 | Grosse ............ H04L 63/0272 726/5 |
| 2006/0034292 A1 | 2/2006 | Wakayama et al. |
| 2006/0190721 A1 | 8/2006 | Kawakami et al. |
| 2006/0209895 A1 | 9/2006 | Hirota |
| 2006/0212549 A1 | 9/2006 | Hokkyo et al. |
| 2006/0274768 A1 | 12/2006 | Suzuki et al. |
| 2006/0288406 A1* | 12/2006 | Kuhn ............ H04L 63/162 726/8 |
| 2007/0006288 A1 | 1/2007 | Mayfield et al. |
| 2007/0016679 A1 | 1/2007 | Mayfield et al. |
| 2007/0101406 A1* | 5/2007 | Zavalkovsky ....... H04L 63/0815 726/4 |
| 2007/0133576 A1 | 6/2007 | Tsuge et al. |
| 2007/0147318 A1 | 6/2007 | Ross et al. |
| 2007/0171870 A1 | 7/2007 | Oba et al. |
| 2007/0195780 A1 | 8/2007 | Cabeca et al. |
| 2007/0240218 A1 | 10/2007 | Tuvell et al. |
| 2007/0266422 A1 | 11/2007 | Germano et al. |
| 2007/0283443 A1 | 12/2007 | McPherson et al. |
| 2008/0066151 A1 | 3/2008 | Thomsen et al. |
| 2008/0086773 A1 | 4/2008 | Tuvell et al. |
| 2008/0101240 A1 | 5/2008 | Rohilla et al. |
| 2008/0140795 A1 | 6/2008 | He et al. |
| 2008/0178294 A1 | 7/2008 | Hu et al. |
| 2008/0261598 A1 | 10/2008 | Tinnakornsrisuphap |
| 2009/0013410 A1 | 1/2009 | Kaler et al. |
| 2009/0028116 A1 | 1/2009 | Beser |
| 2009/0175276 A1 | 7/2009 | Tsuge et al. |
| 2011/0131650 A1 | 6/2011 | De Los Reyes et al. |
| 2011/0173678 A1* | 7/2011 | Kaippallimalil ........ G06F 21/31 726/4 |
| 2012/0066759 A1 | 3/2012 | Chen et al. |
| 2012/0331530 A1 | 12/2012 | Chickering et al. |

OTHER PUBLICATIONS

Infoblox, "Implementing Policy-based Access Control in a Multi-vendor Environment Using IF-MAP," Solution Note, Jul. 2010.*

"TNC Everywhere, Pervasive Security," Trusted Computer Group, 2009, 7 pp. (Applicant points out that, in accordance with MPEP 609.04(a), the 2009 year of publication is sufficiently earlier than the effective U.S filing date and any foreign priority date of Mar. 23, 2015 so that the particular month of publication is not in issue.).

"TCG Trusted Network Connect, TNC IF-MAP Binding for SOAP," Specification Version 2.0, Revision 36, TCG Published, Jul. 30, 2010, 69 pp.

"TCG Trusted Network Connect, TNC IF-MAP Binding for SOAP," Specification Version 1.0, Revision 25, TCG Published, Apr. 28, 2008, 50 pp.

"TCG Trusted Network Connect, TNC IF-MAP Binding for SOAP," Specification Version 1.1, Revision 5, TCG Published, May 18, 2008, 99 pp.

"TCG Trusted Network Connect, Federated TNC," Specification Version 1.0, Revision 26, TCG Published, May 18, 2009, 41 pp.

"Port-Based Network Access Control," IEEE Standard for Local and metropolitan area networks, IEEE Std 802.1X™-2004 (Revision of IEEE Std 802.1X-2001), Dec. 13, 2004, 72 pp.

"Trusted Network Connect IF-MAP Announcement FAQ," Trusted Computing Group, Apr. 2008, 2 pp.

Infoblox, "Implementing Policy-based Access Control in a Multi-vendor Environment Using IF-MAP," Solution Note, Jul. 2010, 3 pp.

Juniper, "Junos Pulse Access Control Service: Guide to IF-MAP Federation," Juniper Networks, Published Jan. 20, 2011, 56 pp.

LINFO, "MAC Address Definition, a unique hardware address," Linux Information Project, Sep. 15, 2008, 2 pp.

IEEE, "802.1X™ IEEE Standard for Local and Metropolitan area networks, Post-Based Network Access Control," IEEE computer Society, Dec. 13, 2004, 179 pp.

"Making NAC Security-Aware with IF-MAP," Interop Labs, Network Access Control Interoperability Lab, Metadata Access Point, Apr. 29, 2008, 2 pp.

Prosecution History from U.S. Pat. No. 8,990,891, dated May 14, 2013 through Feb. 11, 2015, 111 pp.

\* cited by examiner

PROVISIONING LAYER TWO NETWORK ACCESS FOR MOBILE DEVICES

This application is a continuation of U.S. application Ser. No. 13/166,376, filed Jun. 22, 2011, which claims the benefit of U.S. Provisional Application No. 61/477,063, filed Apr. 19, 2011, the entire contents of each of which are incorporated by reference herein.

TECHNICAL FIELD

The invention relates to computer networks and, more particularly, provisioning access to computer networks.

BACKGROUND

Use of cellular mobile devices for accessing computer data networks has recently increased dramatically. These mobile devices, often referred to as "smart" phones, provide a platform for both cellular phone calls and cellular-based access to computer data services. For example, a typical cellular radio access network is a collection of cells that each includes base stations capable of transmitting and relaying radio signals to subscribers' mobile devices. A "cell" generally denotes a distinct area of a cellular network that utilizes a particular frequency or range of frequencies for transmission of data. A typical base station is a tower to which are affixed a number of antennas that transmit and receive the data over the particular frequency. Mobile devices may transmit radio signals at the designated frequency to the base stations to initiate cellular telephone calls or packet-based data services. With respect to data services, cellular service providers convert the cellular signals, e.g., Time Division Multiple Access (TDMA) signals, Orthogonal Frequency-Division Multiplexing (OFDM) signals or Code Division Multiple Access (CDMA) signals, received from mobile devices at the base stations into Internet protocol (IP) packets for transmission within packet-based networks.

The ubiquitous use of cellular mobile devices and the ever increasing desire by users for fast, secure network access from around the world has presented many challenges for enterprises. For example, users may employ their mobile devices to access an enterprise network through both a cellular service provider network and one or more wireless access points of the enterprise network itself. In accessing the enterprise network via both the cellular service provider network and the wireless access point, the user may have to separately authenticate themselves with respect to both forms of accessing the enterprise network. The users typically access the enterprise network via the cellular service provider network from home or on their way to work after authenticating themselves, but are reluctant to access the enterprise network via the wireless access points because they have to re-authenticate themselves prior to accessing the enterprise network via the wireless access points. Yet, the enterprise typically pays for the cellular data service on behalf of the users and, therefore, may prefer that the users access the enterprise network via the wireless access points of the enterprise network to reduce costs. Moreover, the enterprise may prefer that the users access the enterprise network via the wireless access points to alleviate information technology (IT) burdens associated with ensuring security policies of the enterprise network are met. Service providers may also want to securely transition users from the cellular network to wireless access points that are operated by the service provider or a partner of the service provider in order to reduce load placed on the cellular network by mobile devices.

SUMMARY

In general, techniques are described for provisioning layer two (L2) network access for mobile devices to reduce or eliminate the need of users to re-authenticate when transitioning enterprise network access between a cellular service provider network or any other type of public or customer network and a wireless network provided by the enterprise network. The techniques described in this disclosure enable a globally available network device, referred to as a "mobile security gateway" or "MSG" located within a public network, such as the Internet, to publish authentication information and a security status for each mobile device associated with an enterprise to a security database commonly maintained and managed by the enterprise. In other words, the MSG operates within the cellular network to keep track of the security status of all registered mobile devices, including mobile devices for different enterprises that subscribe to the services. The MSG may be separate from any VPN devices and on-campus network infrastructure of any given enterprise and, instead, may be operated within data services of the cellular network or other network provided by a third party. A communication channel between the MSG and each of the customer enterprise networks allows the MSG to securely communicate security status information and MAC addresses or other identifying information for the mobile device to network access elements of the customer enterprise networks. When a mobile device accesses an enterprise network directly though a wireless access point (i.e., no longer through data services of the cellular network), the enterprise network authenticates and provisions network access for the mobile device via MAC authentication using MAC address information and security status information learned directly from the MSG. Alternatively, the enterprise authenticates and provisions network access for the mobile device via 802.1X using a client certificate or other identifying information from the mobile device and security status information learned from the MSG.

A security software client is installed on the mobile device. Prior to accessing the enterprise network, the security software client authenticates to the MSG, which may involve prompting the user for authentication credentials. The MSG may then publish information about the mobile device, including its MAC address, other device identifier, and/or security status or state information to the enterprise security database. When the user transitions from the cellular service provider network to the wireless network provided by the enterprise network, the enterprise network authenticates the user by accessing the enterprise security database rather than requiring the user to re-enter authentication information to authenticate themselves.

In this manner, the techniques may promote use of the generally less expensive form of wireless access by mobile devices in that the users of these mobile devices do not have to re-enter authentication information to authenticate themselves prior to accessing the enterprise network via the wireless network provided by the enterprise. Moreover, the wireless network provided by the enterprise is commonly more easily maintained by IT personnel in that it implements standard layer two (L2) protocols, such as the widely adopted and hardened Ethernet protocol, while accessing the enterprise network via the cellular service provider network often involves more sophisticated devices that are less easily maintained and more likely to offer a less than desirable user experience. By enabling users to seamlessly (at least from the user's perspective in that they do not have to re-enter authentication information) access the enterprise network via the wireless network provided by the enterprise, the techniques may reduce IT costs associated with providing network access via the cellular service provider network in that this form of remote cellular service provider network access is not so heavily used by users who are in fact local to the enterprise network but that are reluctant to re-enter authentication information.

In one embodiment, a method comprises establishing, with a network device positioned in a public network, a session with a mobile device, requesting, with the network device, security state data identifying a security state of the mobile device via the established session, receiving, with the network device, a mobile device identifier and the security state data from the mobile device via the session, wherein the mobile device identifier identifies the mobile device and publishing the security state information to a database such that the security state information is associated with the mobile device identifier.

In another embodiment, a network device located in a public network comprises at least one interface that establishes a session with a mobile device and a control unit that requests security state data identifying a security state of the mobile device via the established session. The at least one interface receives a mobile device identifier and the security state data from the mobile device via the session, wherein the mobile device identifier identifies the mobile device. The control unit publishes the security state information to a database such that the security state information is associated with the mobile device identifier.

In another embodiment, a network system comprises a mobile device, a database, and a public network. The public network includes a network device. The network system also includes a private network. The private network includes an authentication device and a wireless access point. The network device comprises at least one interface that establishes a session with the mobile device and a control unit that requests security state data identifying a security state of the mobile device via the established session. The at least one interface of the network device receives a mobile device identifier and the security state data from the mobile device via the session, wherein the mobile device identifier identifies the mobile device. The control unit of the network device publishes the security state information to a database such that the security state information is associated with the mobile device identifier. The authentication device comprises at least one interface that receives an authentication request from the wireless access point in an attempt by the wireless access point to authenticate the mobile device to locally access the private network wirelessly and a control unit that, based on the authentication request, determines the mobile device identifier that identifies the mobile device with the authentication device, retrieves the security state data associated with the determined mobile device identifier from the database, determines a level of access to the private network permitted to the mobile device based on the retrieved security state data. The at least one interface of the authentication device transmits the level of access to the wireless access point so that the wireless access point enforces, with respect to communications sent to and received from the mobile device, the level of access determined by the authentication device.

In another embodiment, a non-transitory computer-readable medium comprises instructions that, when executed, cause one or more processors to establish, with a network device positioned in a public network, a session with a mobile device, request, with the network device, security state data identifying a security state of the mobile device via the established session, receive, with the network device, a mobile device identifier and the security state data from the mobile device via the session, wherein the mobile device identifier identifies the mobile device and publish the security state information to a database such that the security state information is associated with the mobile device identifier.

The details of one or more embodiments of the techniques are set forth in the accompanying drawings and the description below. Other features, objects, and advantages of the techniques will be apparent from the description and drawings, and from the claims.

DETAILED DESCRIPTION

Figure 1:
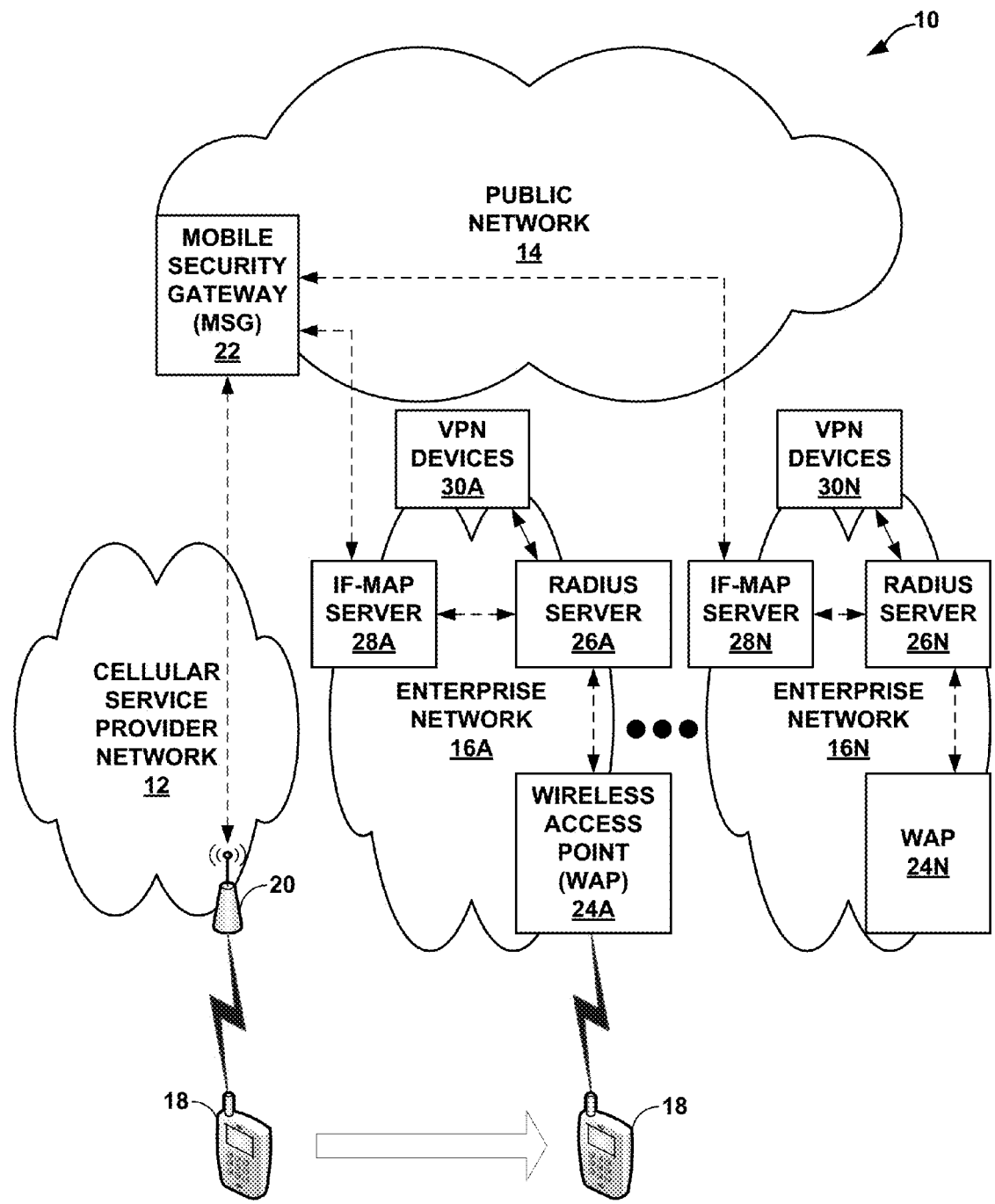
FIG. 1 is a block diagram illustrating an example network system that implements the layer two provisioning techniques described in this disclosure.

FIG. 1 is a block diagram illustrating an example network system 10 that implements the layer two provisioning techniques described in this disclosure. As shown in the example of FIG. 1, system 10 includes a cellular service provider network 12, a public network 14 and enterprise networks 16A-16N ("enterprise networks 16"). Cellular service provider network 12 represents a network that offers wireless or cellular telephone and data service in accordance with common mobile or cellular phone standards, such as standards proposed by the $3^{rd}$ Generation Partnership Project (3GPP), 3GPP2, or any other mobile telecommunication or technology standards body. Such mobile phone services include a general packet radio service (GPRS), enhanced data rates for global system for mobile communications (GSM) evolution (EDGE) service, universal mobile telecommunication systems (UMTS) service, code division multiple access (CDMA) 2000 service (which is commonly referred to as "CDMA2000"), CDMA2000 1x evolution-data optimized (which is often referred to as "CDMA2000 1xEV-DO") or any other service provided in accordance with common mobile telecommunication or technology standards.

Public network 14 represents one or more networks that are each owned and operated by one or more telecommunication companies or other business or enterprise and made available by these companies to the general public commonly as an "Internet" or data service. The Internet may include any network generally accessible by or open to the public. Public network 14 may represent a portion of the Internet or the Internet in its entirety. Cellular service provider network 12, while shown separate from public network 14, may represent a portion of public network 14 in that cellular service provider network 12 provides access to public network 14 and otherwise facilitates the transfer of data, either voice or Internet data, between customer devices of cellular service provider network 12 and public network 14.

Enterprise networks 16 each represents a private network that is not generally accessible by or open to the public. Typically, large businesses or enterprises own and operate one or more of enterprise networks 16 to facilitate the operation of the enterprise and enable employees secure access to documents, applications, servers, printers and other resources. One or more of enterprise networks 16 may include portions that are public in that portions of these enterprise networks 16 may be accessible via public network 14, such as webpages and the like. Generally, however, enterprise networks 16 represent private networks that are owned and operated by one or more enterprises for use by the employees of these enterprises alone.

Typically, employees of the enterprises associated with enterprise networks 16 utilize mobile devices 18 in their normal course of business. Mobile device 18 represents any device capable of communicating with cellular service provider network 12 in accordance with any of the above noted mobile telecommunication services or standards, such as a laptop, a slate or tablet computer, a mobile or cellular phone (including a so-called "smart phone"), a personal digital assistant (PDA), a global positioning system (GPS) device, a portable gaming device, a portable media device or any other similar device. Mobile device 18 may communicate wirelessly with a base station 20 of cellular service provider network 12, where base station 20 represents a device and other wireless communication equipment (such as an antenna) for communicating with mobile devices, including mobile device 18. In some case, enterprises may require that the users register their mobile devices, such as mobile device 18, with a mobile security provider that maintains one or more mobile security gateways (MSG) 22 to monitor and protect the health status of the mobile device 18. For example, MSG 22 may provide real-time virus or malware detection for mobile device 18.

When first accessing MSG 22, mobile device 18 registers with MSG 22. MSG 22 maintains a database or other type of data structure of mobile devices associated with each of enterprise networks 16. This list may identify each of this enterprise's deployed mobile devices by way of a phone number associated with each of these mobile devices, an international mobile equipment identifier (IMEI), a Media Access Control (MAC) address, an identifier of an X.509 certificate, credentials to be used for 802.1X authentication, a username or any other type of mobile device identifier. Mobile device 18 registers with MSG 22 by providing one or more of these mobile device identifiers to MSG 22, which registers mobile device 18 if the provided mobile device identifier appears in its maintained list of mobile device identifiers associated with enterprise network 16A and/or if the user of mobile device 18 provides correct authentication credentials.

In general, MSG 22 monitors the cellular service provider network 12 by receiving communications from mobile devices. The mobile device 18, for example, may contain a client-side virus scanner capable of detecting viruses and may provide an infection report to MSG 22. That is, mobile device 18 may register with MSG 22, download updated anti-virus signatures and provide periodic or on-demand infection reports to the MSG. An infection report may detail the current security state of, for example, the operating system, anti-virus software, anti-spam software and a firewall executing within mobile device 18 or any other type of security state data, including failed enterprise authentication attempts. A reporting/visualization engine of MSG 22 provides enterprise-wide reports for administrators associated with the corporate enterprises as to which mobile devices of their employees are infected or otherwise compromised. Examples of techniques for implementing MSG 22 that monitors malware in a mobile network are described in U.S. Patent Application No. 2008/0086773, entitled "SYSTEM AND METHOD OF REPORTING AND VISUALIZING MALWARE ON MOBILE NETWORKS," by Tuvell et al., Ser. No. 11/869,729, filed Apr. 10, 2008, and U.S. Patent Application No. 2007/0240218, entitled "MALWARE DETECTION SYSTEM AND METHOD FOR MOBILE PLATFORMS," by Tuvell et al., Ser. No. 11/697,647, filed Oct. 11, 2007, each of which is hereby incorporated by reference in its entirety.

When attempting to access one of enterprise networks 16, such as enterprise network 16A, remotely via cellular service provider network 12 using mobile device 18, enterprise network 16A may require that mobile device 18 is secure as defined by an enterprise security policy. The enterprise may define this enterprise security policy such that mobile device 18 is only permitted to access enterprise network 16A if properly configured with the latest security patches to an operating system executing on mobile device 18, the latest anti-virus signatures, anti-spam signatures, firewall settings, or any other combination of security settings. Typically, to enable application of this type of enterprise security policy, the enterprise that distributes mobile device 18 to its employees provides an application with which the user interacts to establish a VPN connection with enterprise network 16A. In the example of FIG. 1, each of enterprise networks 16 include a respective one of VPN devices 30A-30N ("VPN devices 30"). VPN devices 30 generally represent devices for establishing VPN connections through public network 14 with devices located remotely from enterprise network 16 (although devices located local to enterprise networks 16 may also form a VPN connection). While described as separate devices, each of VPN devices 30 may be implemented as a software module within a network device, such as a router or other type of network devices.

When the user transitions from cellular service provider network 12 to enterprise network 16A, such as when the user commutes from home to work, the enterprise also provides a wireless network component of enterprise network 16A to facilitate local access to enterprise network 16A by wireless devices, such as mobile device 18. Enterprise network 16A may include a wireless access point (WAP) 24A by which mobile device 18 may communicate with this wireless network aspect of enterprise network 16A. WAP 24A represents a network device that communicates wirelessly with another network device, such as mobile device 18, in accordance with one or more of Institute of Electrical and Electronics Engineers (IEEE) 802.11 standards, such as one or more of the IEEE 802.11a standard, IEEE 802.11b standard, IEEE 802.11g standard and IEEE 802.11n standard.

Enterprise network 16A also includes a remote access dial in user service (RADIUS) server 26A that provides authentication, authorization and accounting (AAA) services in accordance with an AAA protocol. Typically, when mobile device 18A attempts to access enterprise network 16A via WAP 24A and thereby establish a session with enterprise network 16A (such as a server of enterprise network 16A), WAP 24A interacts with RADIUS server 26A to authenticate the user of mobile device 18.

That is, WAP 24A sends RADIUS messages to RADIUS server 26A regarding mobile device 18, and RADIUS server 26A responds with various RADIUS messages that may include Accept, Reject, or Challenge messages. When WAP 24A receives a Challenge message from RADIUS server 26A, WAP 24A, for example, sends a message to mobile device 18. The user then enters the appropriate authentication information and mobile device 18 prompts the user to enter authentication information, such as a username and password (which may be read from the security fob in some instances). Device 18 sends the authentication information to WAP 24A, which includes the authentication information in a RADIUS message sent to RADIUS Server 26A. Upon successfully authenticating the user, RADIUS server 26A sends an Accept message to WAP 24A, and WAP 24A permits device 18 access to enterprise network 16. The Accept message from RADIUS server 26A may include restrictions that restrict or otherwise limit access to enterprise network 16 by mobile device 18.

The enterprise typically wants to encourage its users to access the network locally via the wireless aspect of enterprise network 16A from their respective mobile devices 18 rather than using a cellular service provider network 12. Typically, the local connection is more cost effective for the enterprise as the enterprise wireless infrastructure is owned and operated by the enterprise specifically to leverage its wired (more than likely wholesale) Internet connection rather than utilize what may be a data fee-based cellular service provider connection. In other words, the cost of transmitting data on a per byte basis is typically much larger on the cellular service provider network in comparison to the cost of transmitting data on a per byte basis using the wireless network aspect of enterprise network 16A. Moreover, there are other benefits associated with using the wireless aspect of enterprise network 16A over remote access via cellular service provide network 12, such as improved data bandwidth, improved data response time (such as measured by a ping command), and improved user experience.

Yet, users of mobile devices may be reluctant to authenticate themselves when getting to work and attempting to locally access enterprise network 16A via WAP 24A. In most instances, the user does not even attempt to access enterprise network 16A locally via WAP 24A because the cellular service provider connection has already been established and some users are unable to differentiate between cellular service provider-based access and local WAP-based access.

In accordance with the techniques described in this disclosure, MSG 22 may publish the above noted security state information to an enterprise security database such that RADIUS server 26A may retrieve this information from the database rather than having to challenge the user of mobile device 18 to provide the authentication information once again or requiring mobile device 18 to support 802.1X local area network (LAN) authentication. To illustrate, MSG 22 may, as noted above, receive registration information from mobile device 18 via a cellular service provider network 12. This registration information registers mobile device 18 with MSG 22 and may include, as noted above, a phone number and an IMEI. Mobile device 18 may establish a session terminated at one end by mobile device 18 and at the other end by MSG 22. Mobile device 18 may provide the registration information discussed above via this established session.

Mobile device 18 may also transmit what may be considered as additional registration information in the form of a media access control (MAC) address assigned to mobile device 18. This MAC address is typically assigned to an interface or controller of mobile device 18 and uniquely identifies this interface or controller of mobile device 18 in a layer 2 (L2) of a network, such as enterprise network 16A. Layers followed by a number denote a layer of the Open Systems Interconnection (OSI) model. In this sense, the identifier may be referred to as an L2 identifier. While both a cellular interface of mobile device 18 for interfacing with cellular service provider network 12 and a wireless network interface of mobile device 18 for interfacing with WAP 24A may be assigned a MAC address, mobile device 18 provides the MAC address associated with the wireless network interface even though mobile device 18 is communicating with MSG 22 via the cellular interface.

The techniques may therefore extend the type of registration information that is sent to MSG 22 in comparison to typical registration that is conventionally sent which does not include this MAC address as registration information (although it may include it in the header of a packet but is not used as registration information). Mobile device 18 may send this registration information via a simple messaging service (SMS) message or via a data packet formulated in accordance with a layer 3 (L3) protocol, such as an Internet protocol (IP). MSG 22 registers mobile device 18 by ensuring that the mobile device identifiers provided by mobile device 18 correspond to one entry in the list or other data structure that defines all of the deployed mobile devices by the enterprise operating enterprise network 16A and/or by prompting the user of mobile device 18 for credentials.

In any event, assuming MSG 22 successfully registers mobile device 18 based on at least some portion of the registration information, mobile device 18 transmits the security state data to MSG 22, which receives the security state information from the mobile device via cellular service provider network 12. MSG 22 publishes the security state information to an entry of an enterprise security database associated with the MAC address. MSG 22 may augment this security state information prior to publishing it to IF-MAP server 28A. MSG 22 may for example augment the security state information to include a time at which this security state information was provided to MSG 22. This time may be used, as described in more detail below, to determine whether the security state information is still valid or whether it has timed-out or expired.

In the example of FIG. 1, the enterprise security database for enterprise 16A is shown as an Interface for Metadata Access Point (IF-MAP) server 28A ("IF-MAP server 28A"). More information with regard to IF-MAP servers 28A and an IF-MAP protocol implemented by IF-MAP server 28A may be found in a most recent IF-MAP specification, entitled "TNC IF-MAP Binding for SOAP," Specification Version 2.0, Revision 36, dated Jul. 30, 2010, the entire contents of which are hereby incorporated by reference as if set forth in its entirety. While described with respect to an IF-MAP server 28A, the techniques may be implemented with respect to any server made available by an enterprise network, including servers that implement older or less recent versions of IF-MAP and any successors to IF-MAP.

Often, enterprise networks 16 include a network device that prohibits public access to enterprise networks 16 via public network 14 referred to as a firewall. Typically, each of enterprise networks 16 includes a firewall (which is not shown in the example of FIG. 1 for ease of illustration purposes). To enable MSG 22 located in public network 14 to publish this security state information or data to IF-MAP server 28A located behind this firewall within enterprise network 16A, an administrator or other network operator may configure the firewall to permit MSG 22 to access IF-MAP server 28A. Typically, the administrator opens a port of the firewall associated with IF-MAP communications, such as port 443, so that MSG 22 may publish the security state data to IF-MAP server 28A.

By publishing this security state information to IF-MAP server 28A, MSG 22 enables RADIUS server 26A to then perform a form of authentication referred to as MAC authentication using this published security state information, which may not require re-authentication of the user of mobile device 18 or implementation of a more onerous IEEE 802.1X LAN authentication standard by mobile device 18 when attempting to wirelessly access enterprise network 16A locally via WAP 24A. To illustrate, mobile device 18 may transition from home to work, where mobile device 18 may attempt to wirelessly access enterprise network 16A locally via WAP 24A. To wirelessly access enterprise network 16A via WAP 24A, mobile device 18 transmits its MAC address (or potentially any other comparable mobile device identifier) to WAP 24A, which forwards this MAC address by generating and sending a RADIUS message to RADIUS server 26A for authentication via MAC address authentication. RADIUS server 26A may determine the extent to which mobile device 18 may access enterprise network 16A by accessing IF-MAP server 28A using the provided MAC address to retrieve the security state information previously published to IF-MAP server 28A by MSG 22.

In response to accessing IF-MAP server 28A, RADIUS server 26A receives the security state information (which as noted above may have been augmented prior to publishing to include the time at which this security state information was received from mobile device 18 by MSG 22). Based on this security state information, RADIUS server 26A determines a level of enterprise network access mobile device 18 is permitted. RADIUS server 26A provisions mobile device 18 with this level of enterprise network access, whereupon RADIUS server 26A permits mobile device 18 to wirelessly access enterprise network 16A.

From the perspective of the user of mobile device 18, the entire local authentication process performed by RADIUS server 26A may be seamless or, in other words, require little if any user interaction. For example, the user may select to access enterprise network 16A wirelessly via WAP 24A, at which point, mobile device 18 performs the above actions without requiring any further user input from the user. Consequently, the techniques may avoid requirements in conventional systems that require the users to re-authenticate themselves prior to permitting mobile device 18 access to enterprise network 16A.

Moreover, the techniques do not rely on the more onerous 802.1X standard and therefore may not require that mobile devices 18 support this 802.1X standard. For those devices that do, however, support the 802.1X standard, the techniques may be adapted to work in conjunction with the 802.1X standard. For types of mobile device 18 having an 802.1X supplicant that is capable of being provisioned with 802.1X authentication credentials, such as a client certificate or a username and password, MSG 22 may provision mobile device 18 with authentication credentials during device registration. As with MAC authentication, device 18 provides security settings and its MAC address to MSG 22, which MSG 22 publishes to IF-MAP Server 28. When mobile device 18 authenticates to WAP 24A, mobile device 18 uses 802.1X authentication with the authentication credentials provisioned by MSG 22. The 802.1X authentication credentials may be opaque to WAP 24A, because WAP 24A is not responsible for decrypting these credentials and thus need not know of their transmission. RADIUS server 26A may then use the authentication credentials to verify that device 18 is registered with MSG 22 and not just spoofing (meaning, fraudulently misrepresenting) the MAC address of mobile device 18, and uses the MAC address of mobile device 18 to access the security settings and user information stored in IF-MAP Server 28 in the same manner as previously described.

The enterprise may therefore employ the techniques described in this disclosure to reduce the likelihood of users utilizing cellular service provider network 12 to remotely access enterprise network 16A when those users are in fact local to and could wirelessly access enterprise network 16A via the typically cheaper wireless aspect of enterprise network 16A, as the techniques promote seamless transitioning from a remote connection to a local connection. By potentially increasing the number of mobile devices that utilize the wireless aspect or component of enterprise network 16A, the techniques may reduce costs associated with enterprise network access via cellular service provider network 12.

While described with respect to enterprise network 16A, MSG 22 may service or otherwise provide this remote access security service for each of enterprise networks 16. The techniques should therefore not be limited strictly to the example described above with respect to enterprise network 16A. Moreover, each of enterprise networks 16 may include a WAP similar to WAP 24A, a RADIUS server similar to RADIUS server 26A, an IF-MAP server similar to IF-MAP server 28A, and a firewall similar to firewall 30A. These similarities are shown in the example of FIG. 1 in that each of enterprise networks 16 includes a respective one of WAPs 24A-24N ("WAPs 24"), RADIUS servers 26A-26N ("RADIUS servers 26"), IF-MAP servers 28A-28N ("IF-MAP servers 28") and firewalls 30A-30N ("firewalls 30"). Although shown as being similar if not substantially the same as each other, enterprise networks 16 may diverge from one another in how security policies are enforced (e.g., some may or may not employ firewalls). The techniques therefore should also not be limited in this respect strictly to the example of FIG. 1.

In addition, while described with respect to cellular service provider network 12, the techniques may be implemented with respect to any other type of network. These other types of networks may comprise a wireless hotspot, such as those found at restaurants coffee shops and other public venues. These other types of networks may also include a user's home wireless or wired network. In some instances, the other types of networks may include another enterprise network that is geographically separate from enterprise network 16A. The techniques may therefore generally permit mobile device 18 to register with MSG 22 via a network, whether a cellular service provider network or not, and access enterprise network 16A remotely and transition seamlessly to the wireless component of enterprise network 16A without having to re-authenticate the user of mobile device 18 prior to accessing enterprise network 16A.

Figure 2A:
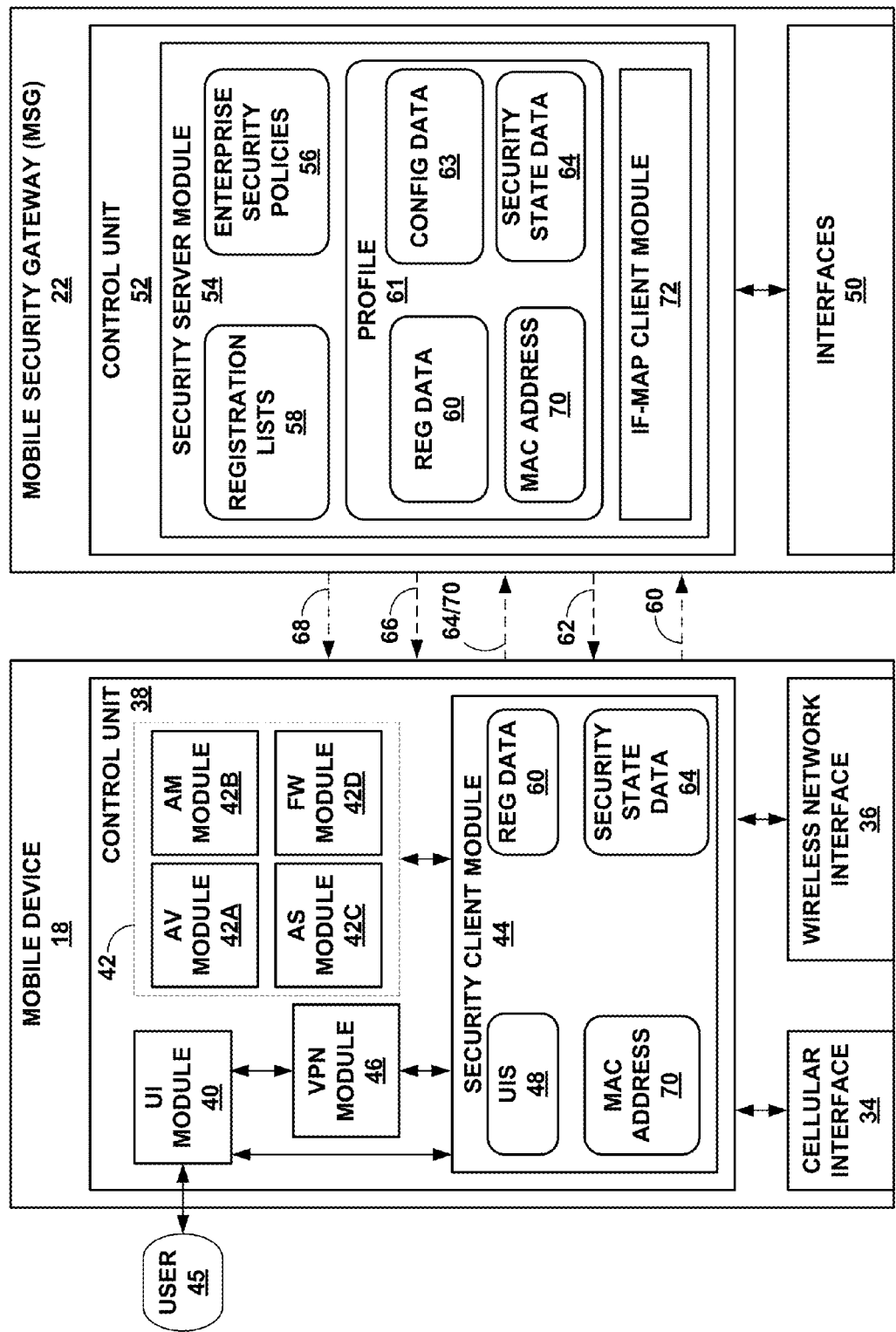
FIGS. 2A-2C are block diagrams illustrating various aspects of network system shown in the example of FIG. 1 in more detail.
Figure 2B:
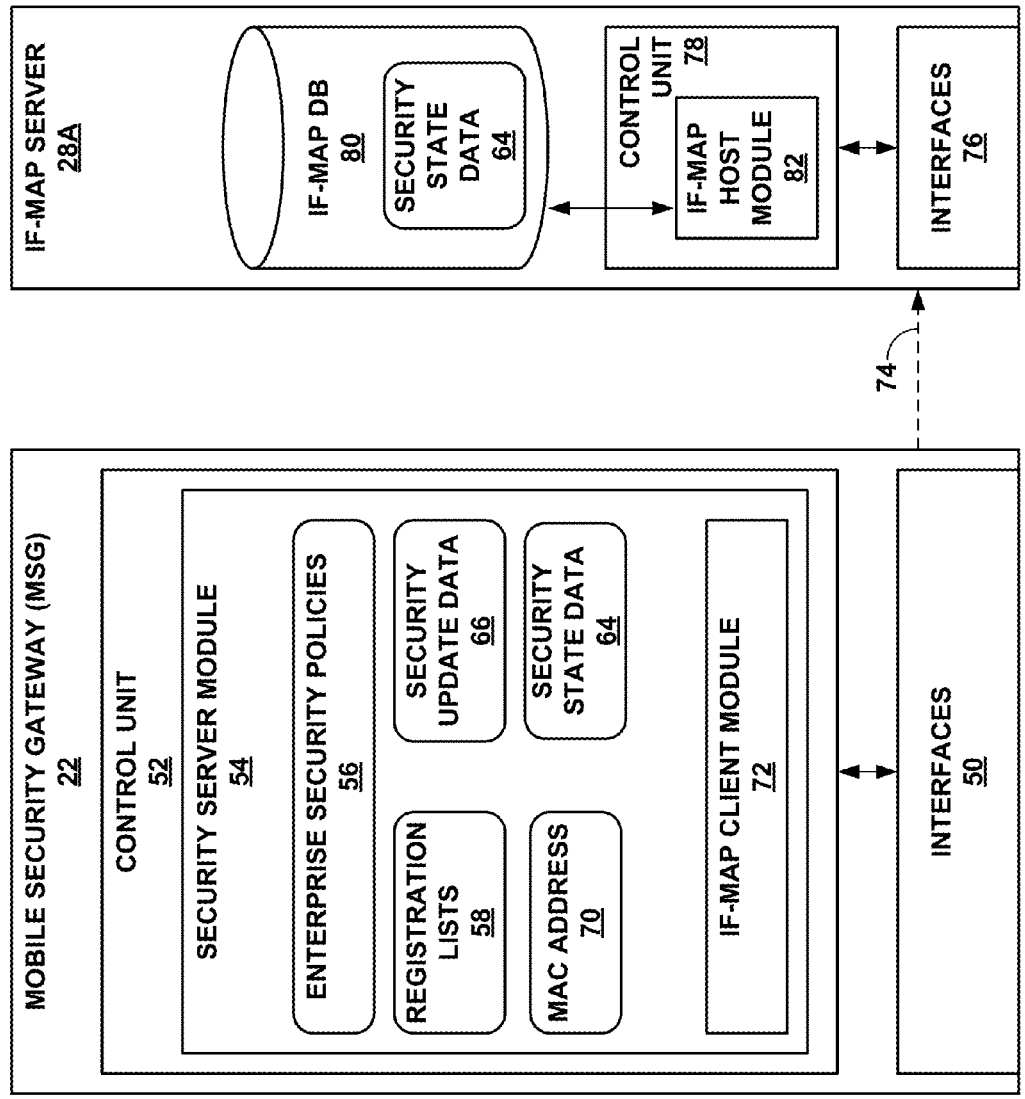
Figure 2C:
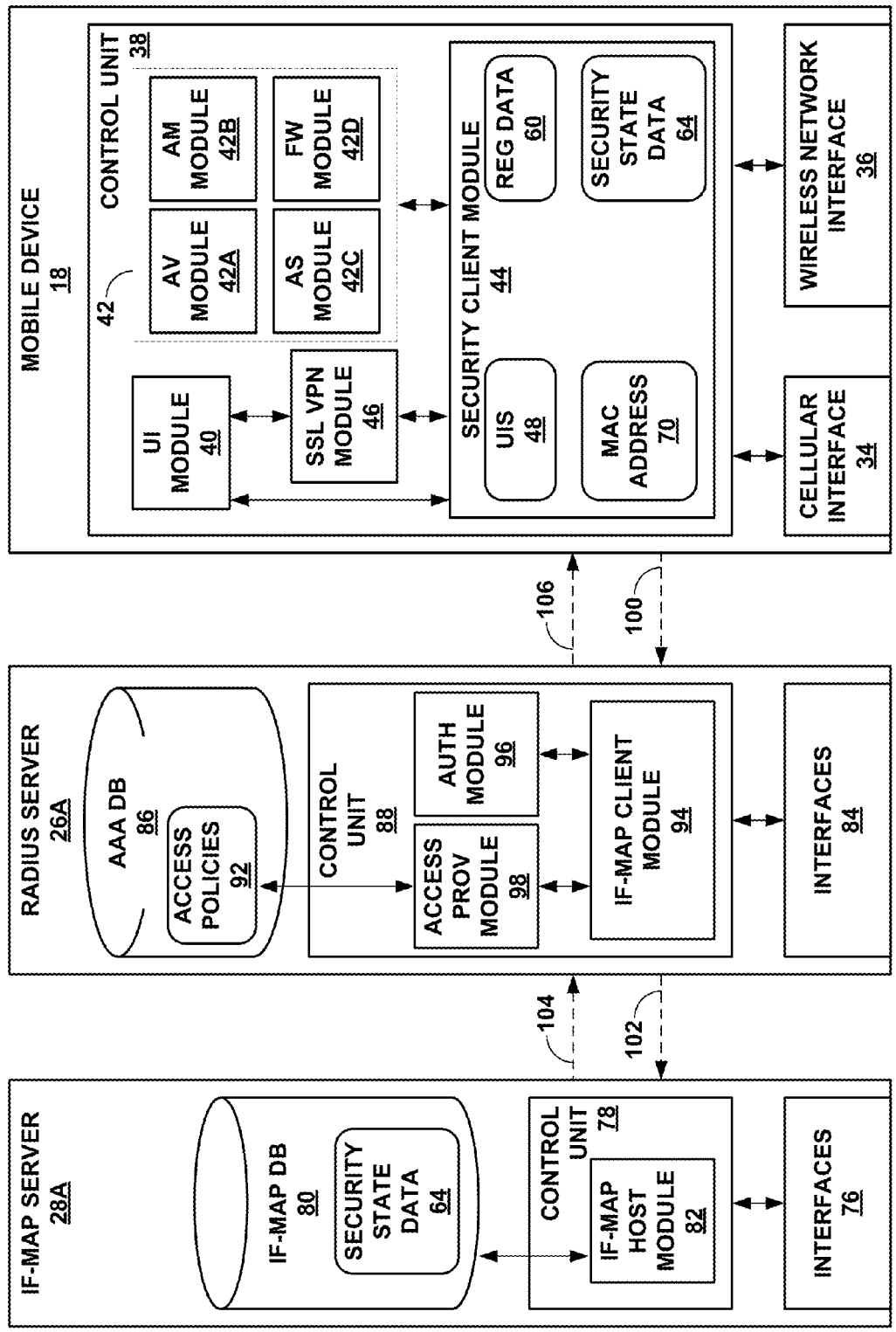

FIGS. 2A-2C are block diagrams illustrating various aspect of system 10 shown in the example of FIG. 1 in more detail. FIG. 2A is a block diagram illustrating mobile device 18 and MSG 22 of FIG. 1 when mobile device 18 accesses MSG 22. FIG. 2B is a block diagram illustrating MSG 22 and IF-MAP server 28A of FIG. 1 when MSG 22 publishes security state data 32 to IF-MAP server 28A. FIG. 2C is a block diagram illustrating IF-MAP server 28A, RADIUS server 26A and mobile device 18 of FIG. 1 when RADIUS server 26A provisions wireless access to enterprise network 26A via WAP 24A for mobile device 18.

Referring first to FIG. 2A, mobile device 18 includes a cellular interface 34, a wireless network interface 36 and a control unit 38. Cellular interface 34 represents an interface by which mobile device 18 may wirelessly communicate with cellular service provider network 12. Typically, cellular interface 34 implements one or more of the common mobile or cellular phone standards, such as standards proposed by the $3^{rd}$ Generation Partnership Project (3GPP), 3GPP2, or any other mobile telecommunication or technology standards body. Cellular interface 34 may also implement one or more mobile phone services, where such mobile phone services may include a general packet radio service (GPRS), enhanced data rates for global system for mobile communications (GSM) evolution (EDGE) service, universal mobile telecommunication systems (UMTS) service, code division multiple access (CDMA) 2000 service (which is commonly referred to as "CDMA2000"), CDMA2000 1× evolution-data optimized (which is often referred to as "CDMA2000 1×EV-DO") or any other service provided in accordance with common mobile telecommunication or technology standards. Wireless network interface 36 may represent an interface by which mobile device 18 may wirelessly communicate with a local area network (LAN) or a wide area network (WAN). Wireless network interface 36 may implement one or more of the IEEE 802.11 standards, such as one or more of the IEEE 802.11a standard, IEEE 802.11b standard, IEEE 802.11g standard and IEEE 802.11n standard, as well as early 802.11 standards and any successors.

Control unit 38 may represent one or more processors (not shown in FIG. 2A) that execute software instructions, such as those used to define a software or computer program, stored to a computer-readable storage medium (again, not shown in FIG. 2A), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, control unit 38 may represent dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 38 includes a user interface (UI) module 40 ("UI module 40"), service modules 42, a security client module 44 and a VPN module 46. UI module 40 may represent a module with which a user, such as user 45, may interface to interact with mobile device 18. Commonly, UI module 40 presents one or more command line interfaces (CLIs), graphical user interfaces (GUIs) or any other type of UI with which user 45 interface to input data and receive data from mobile device 18. As shown in the example of FIG. 2A, service modules 42 comprise an anti-virus (AV) module 42A ("AV module 42A"), an anti-malware (AM) module 42B ("AM module 42B"), an anti-spam (AS) module 42C ("AS module 42C") and a firewall (FW) module 42D ("FW module 42D"). AV module 42A represents a module that analyzes data stored to mobile device 18 using anti-virus signatures to detect the presence of viruses within mobile device 18. AM module 42B represents a module that analyzes data stored to mobile device 18 using anti-malware signatures to detect the presence of so-called "malware" within mobile device 18, where the term "malware" is commonly used to denote "malicious software." AS module 42C represents a module that analyzes SMS and email messages sent from and to mobile device 18 using anti-spam policies to detect "spam", where "spam" refers to undesirable and potentially malicious SMS or email messages. The transmission of "spam" messages may be blocked by AS module 42C. FW module 42D represents a module that performs operations similar to those described above with respect to firewalls 30 shown in the example of FIG. 1. FW module 42D may, for example, block connections from public network 14 to mobile device 18 if those connections do not originate from mobile device 18. Security client module 44 represents a module that manages the security state of mobile device 18.

As further shown in the example of FIG. 2A, MSG 22 includes interfaces 50 and a control unit 52. Interfaces 50 may represent any type of network interface that is capable of receiving and transmitting data via a network. Interfaces 50 typically include wired interfaces, but may include interfaces that are substantially similar to cellular interface 34 and wireless network interface 36. Control unit 52 may be substantially similar to control unit 38. Control unit 52 includes a security server module 54 that validates the security state of mobile devices, such as mobile device 18. That is, security server module 54 represents a module that receives security state data from registered mobile devices and validates this received security state data with respect to one or more of enterprise security policies 56. Each of enterprise security policies 56 represents data that defines rules with respect to security features of deployed mobile devices by an associated enterprise. These rules may specify, for example, that anti-virus modules executing within any given mobile device be enabled.

As noted above, security client module 44 of mobile device 18 may register with MSG 22, which then provides configuration information to configure current modules of mobile device 18. For example, MSG 22 may, upon registering mobile device 18, provide configuration information configuring one or more of AV module 42A, AM module 42B, AS module 42C and FW module 42D. This configuration information may enable one or more of these modules 42 or otherwise provide signatures and other information necessary to facilitate the operation of these modules 42. MSG 22 stores data defining registration lists 58. Registration lists 58, as noted above, may define a list of registered mobile devices. One or more of registration lists 58 may be associated with enterprise networks 16 and define mobile devices deployed by the corresponding enterprise that are available to remotely access enterprise networks 16.

To register mobile device 18, security client module 44 collects registration data 60 ("reg data 60"). Registration data 60 may include a phone number associated with mobile device 18 and the IMEI or any other data commonly provided to register a mobile device with a network device or cellular devices (such as base station 20 shown in the example of FIG. 1). Registration data 60 may also include authentication credentials of the user operating device 18, such as those provided to perform authentication in accordance with the 802.1X standard. Security client module 44 then transmits registration data 60 to mobile security gateway 22 via cellular interface 34. MSG 22 receives registration data 60 and invokes security server module 54. Security service module 54 determines whether any of the mobile device identifiers specified in registration data 60 match any of the mobile device identifiers specified in any one of registration lists 58 and/or validates the authentication credentials specified in registration data 60. If no match is found and/or the authentication credentials are invalid, registration fails. If a match is found and/or the authentication credentials are valid, security server module 54 registers mobile device 18 by denoting that mobile device 18 is active within registration lists 58. Security server module 54 then transmits a registration message 62 via one of interfaces 50 that indicates that mobile device 18 has successfully registered with MSG 22.

Security server module 54 of MSG 22 may, upon registering mobile device 18, create a profile 61 of mobile device 18 based on enterprise security policies 56 and registration data 60. Depending on which one of registration lists 58 mobile device 18 was registered, security server module 54 may determine the one of enterprise networks 16 to which mobile device 18 is attempting to access. Alternately, security server module 54 may determine the one of enterprise networks 16 to which mobile device 18 is attempting to access by a license or enterprise code provided at the time of registration. Registration data 60 may, in some instances, include this license or enterprise code. In any event, security server module 54 may generate this profile 61 that defines application of a corresponding one of enterprise security policies 56 to mobile device 18. This profile 61 may store an association between MAC address 70 and registration data 60 as well as configuration ("config") data 63 for configuring various ones of security modules 42 executed by mobile device 18. Config data 63 may be stored or otherwise specified as the appropriate one of enterprise security policies 56.

Security server module 54 of MSG 22 then provisions security features of mobile device 18 based on this profile 61. Profile 61 includes configuration data 63, as noted above, which may define settings for modules 42, specifying whether each of these modules 42 are enabled, which features of these modules 42 are enabled or disabled and other information required to configure modules 42 for execution by mobile device 18 in a manner consistent with the corresponding one of enterprise security policies 56. In addition, MSG 22 may determine additional information concerning the user of mobile device 18, a type of mobile device 18, an operating system executed by mobile device 18, anti-virus and other security state data 64. Security state data 64 may include, for example, one or more of an 802.1X configuration to be applied to the native 802.1X supplicant on the mobile device (for the example noted above where 802.1X authentication is used in conjunction with the techniques described in this disclosure), information about one or more of active viruses and malware present on the mobile device, the identity of a user operating the mobile device, and information about a hardware platform of the mobile device. MSG 22 may store this information to profile 61 in addition to configuration data 63, registration data 60 and MAC address 70.

Meanwhile, security server module 54 of MSG 22 may publish this security state data 64 to IF-MAP server 28A located within enterprise network 16A. Security client module 44 may include a L2 address associated with mobile device 18, such as a L2 media access control (MAC) address 70, when forwarding registration data 60. Security server module 54 receives MAC address 70 along with registration data 60 and stores this MAC address as MAC address 70 to profile 61. Security server module 54 includes an IF-MAP client module 72 for interfacing with IF-MAP server 28A. IF-MAP client module 72 represents a module that implements the IF-MAP protocol so as to interface with IF-MAP server 28A. IF-MAP client module 72 of MSG 22 transmits an IF-MAP publish message 74 (FIG. 2B) to IF-MAP server 28A, where IF-MAP publish message 74 requests that security state data 64 be stored or otherwise published to an entry of IF-MAP server 28A associated with MAC address 70. In some instances, IF-MAP client module 72 publishes profile 61 to IF_MAP server 28A to an entry of IF-MAP server 28A associated with MAC address 70.

As shown in the example of FIG. 2B, IF-MAP server 28A includes interfaces 76 that may be substantially similar to interfaces 50 of MSG 22 and a control unit 78 that may be substantially similar to control units 52 and 38 of MSG 22 and mobile device 18, respectively. IF-MAP server 28A also includes an IF-MAP database (DB) 80 ("IF-MAP DB 80"). IF-MAP database 80 represents a database that stores data in accordance with an IF-MAP protocol. Control unit 78 includes an IF-MAP host module 82, which represents a module that implements the IF-MAP protocol to process IF-MAP publish messages, such as IF-MAP publish message 74, and generate IF-MAP messages in response to IF-MAP query messages. In this example, IF-MAP host module 82 receives IF-MAP publish message 74 via one of interfaces 76, processes IF-MAP publish message 74 to extract security state data 64 and MAC address 70 and stores security state data 64 to an entry of IF-MAP database 80 associated with MAC address 70. In some instances, IF-MAP database 80 may have to create a new entry and associate this new entry with MAC address 70 prior to publishing security state data 64 to IF-MAP database 80.

In the example of FIG. 2C, mobile device 18 has transitioned from home or from otherwise being remote from enterprise network 16A to being local to enterprise network 16A. Upon transitioning to enterprise network 16A, security client module 44 may detect that mobile device 18 is local to the wireless component of enterprise network 16A and then attempt to interface with, as one example, WAP 24A (which is not shown in the example of FIG. 2C in more detail for ease of illustration purposes) via wireless network interface 36 (rather than cellular interface 34). Security client module 44 may detect that mobile device 18 is local to the wireless component of enterprise network 16A by scanning for a service set identifier (SSID) associated with WAP 24A or any other wireless component of enterprise network 16A (as there may be multiple wireless networks in operation by the enterprise). Typically, WAPs, such as WAP 24A, broadcast their SSIDs and security client module 44 may periodically scan for the SSID associated with WAP 24A. In some instances, this scan may be triggered by user 45 when user 45 attempts to access an application or other program that requests or, in some instances, requires network access. Security client module 44 may, when connected to a cellular service provider network 12, scan for the SSID associated with WAP 24A, prior to utilizing the cellular service provider connection so as to always favor the local connection over the remote and often more expensive cellular service provider connection. In some instances, WAP 24A may not broadcast the SSID publicly. In these instances, security client module 44 may have been pre-configured (typically during registration with MSG 22) prior to deployment of mobile device 18 to user 45 with the SSID. Rather than scan, security client module 44 may attempt to access WAP 24A using the preconfigured SSID prior to utilizing the VPN or other non-enterprise connection (such as a cellular service provider connection). Assuming that security client module 44 locates WAP 24A by its SSID, security client module 44 proceeds to establish a local connection with WAP 24A via wireless network interface 36 rather than cellular interface 34.

WAP 24A may receive this request to access (or otherwise form a session with) enterprise network 16A. WAP 24A, in response to this request to access enterprise network 16A, may exchange messages with RADIUS server 26A. As shown in the example of FIG. 2C, RADIUS server 26A includes interfaces 84, an authentication, authorization and accounting (AAA) database (DB) 86 ("AAA DB 86") and a control unit 88. Interfaces 84 may be substantially similar to interfaces 76 of IF-MAP server 28A and interfaces 50 of MSG 22. Authentication database 86 represents a database that stores access policies 92. Access policies 92 represent policies for provisioning access to authenticated devices. Access policies 92 may define permissions for any given authenticated device that enables them to access pertinent portions of enterprise network 16A. Access policies 92 may be based on information from IF-MAP server 28A, such as the user of a device or the security features enabled on a device. Control unit 88 may be substantially similar to one or more of control units 38 of mobile device 18, control unit 78 of IF-MAP server 28A and control unit 52 of MSG 22. Control unit 88 includes an IF-MAP client module 94 that may be substantially similar to IF-MAP client module 72 of MSG 22, an authentication (auth) module 96 ("auth module 96") and an access provisioning (prov) module 98 ("access prov module 98"). Authentication module 96 represents a module capable of performing MAC authentication as well as other types of authentication, including authentication in accordance with the 802.1X standard. Access provisioning module 98 represents a module that provisions L2 access based on security state data, such as security state data 64 stored to IF-MAP server 28A.

Upon receiving a RADIUS Request message from WAP 24A, RADIUS server 26A invokes authentication module 96. The RADIUS Request message sent to RADIUS server 26A within the session includes the MAC address associated with mobile device 18, i.e., MAC address 70 in this example. That is, RADIUS Request message, such as message 100, from WAP 24A XX associated with the session between WAP 24A and RADIUS server 26A include a RADIUS attribute that defines MAC address 70, where a RADIUS attribute is commonly defined as a type-length-value (TLV) field including a type sub-field specifying the type of the attribute, a length sub-field specifying a length of the value sub-field and the value sub-field specifying the value for the attribute of the given type. RADIUS server 26A invokes authentication module 96, passing MAC address 70 to authentication module 96. authentication module 96 invokes IF-MAP client module 94, passing authentication MAC address 70 to IF-MAP client module 94.

In invoking IF-MAP client module 94, authentication module 96 instructs IF-MAP client module 94 to query IF-MAP server 28A for any security state data associated with authenticated MAC address 70. IF-MAP client module 94 then generates an IF-MAP query 102 requesting any security state data stored to IF-MAP server 28A that is associated with authentication MAP address 70. IF-MAP client module 94 transmits this IF-MAP query to IF-MAP server 28A via one of interfaces 84. IF-MAP host module 82 receives this IF-MAP query 102 via one of interfaces 76. In response to this IF-MAP query 102, IF-MAP host module 82 queries IF-MAP database 80 for any security state data associated with authenticated MAC address 70 specified in IF-MAP query 102. IF-MAP database 80, in this example, returns security state data 64 to IF-MAP host module 82. IF-MAP host module 82, upon receiving this security state data 64, generates an IF-MAP message 104 such that this IF-MAP message 104 includes security state data 64. In some instances, IF-MAP host module 82 retrieves profile 61 that includes security state data 64 and generates IF-MAP message 104 to include profile 61. In any event, in response to IF-MAP query 102, IF-MAP host module 82 then transmits this IF-MAP message 104 to RADIUS server 26A via one of interfaces 76. IF-MAP client module 94 of RADIUS server 26A receives IF-MAP message 104 via one of interfaces 84. IF-MAP client module 94 parses security state data 64 (or, possibly, profile 61) from IF-MAP message 104 and invokes access provisioning module 98, passing security state data 64 (or, possibly, profile 61) to access provisioning module 98.

Once invoked, access provisioning module 98 determines a level of access permitted to mobile device 18 based on security state data 64 and access policies 92. The level of access may define one or more resources of the private network to which mobile device 18 is allowed to access or denied access, as well as, potentially a quality of service agreed to be provided to that mobile device 18. Access provisioning module 98 applies access policies 92 to security state data 64 to determine this level of permitted access. Access provisioning module 98 then generates an access provisioning message 106 identifying the level of access to enterprise network 16A permitted mobile device 18. Access provisioning module 98 then transmits access provisioning message 106 via one of interfaces 84 to WAP 24A. WAP 24A receives this access provisioning message 106 (which upon successful authentication of the user operating mobile device 18 typically comprises a RADIUS Accept message) via its network interface. WAP 24A parses access provisioning message 106 to determine the level of access to enterprise network 16A permitted to mobile device 18. WAP 24A then monitors communications sent and received via wireless network interface 36 and enforces the level of access to enterprise network 16 authorized by the associated level of access.

In this manner, the techniques described in this disclosure may enable seamless L2 provisioning when transitioning from a cellular service provider or other remote connection to a local connection. From the perspective of user 45, transitioning from the cellular service provider network to the local connection may not involve any user interaction (except for possibly selecting which of the wireless components of enterprise network 16A to access, especially if more than one is available) and therefore appears seamless to user 45. As a result, the techniques may overcome the tendency of users to continue using the cellular service provider network due to having to re-authenticate themselves prior to access the wireless component of enterprise network 16A. Moreover, the techniques do not rely on more sophisticated authentication schemes that are often difficult or impossible to implement and deploy with respect to certain mobile devices, such as authentication in accordance with the 802.1X standard. Considering that these techniques may seamlessly transition to the local connection whenever the local connection is determined to be available, the techniques may reduce costs associated with the cellular connection as well as reduce IT burdens associated with maintaining this form of remote connection.

Figure 3:
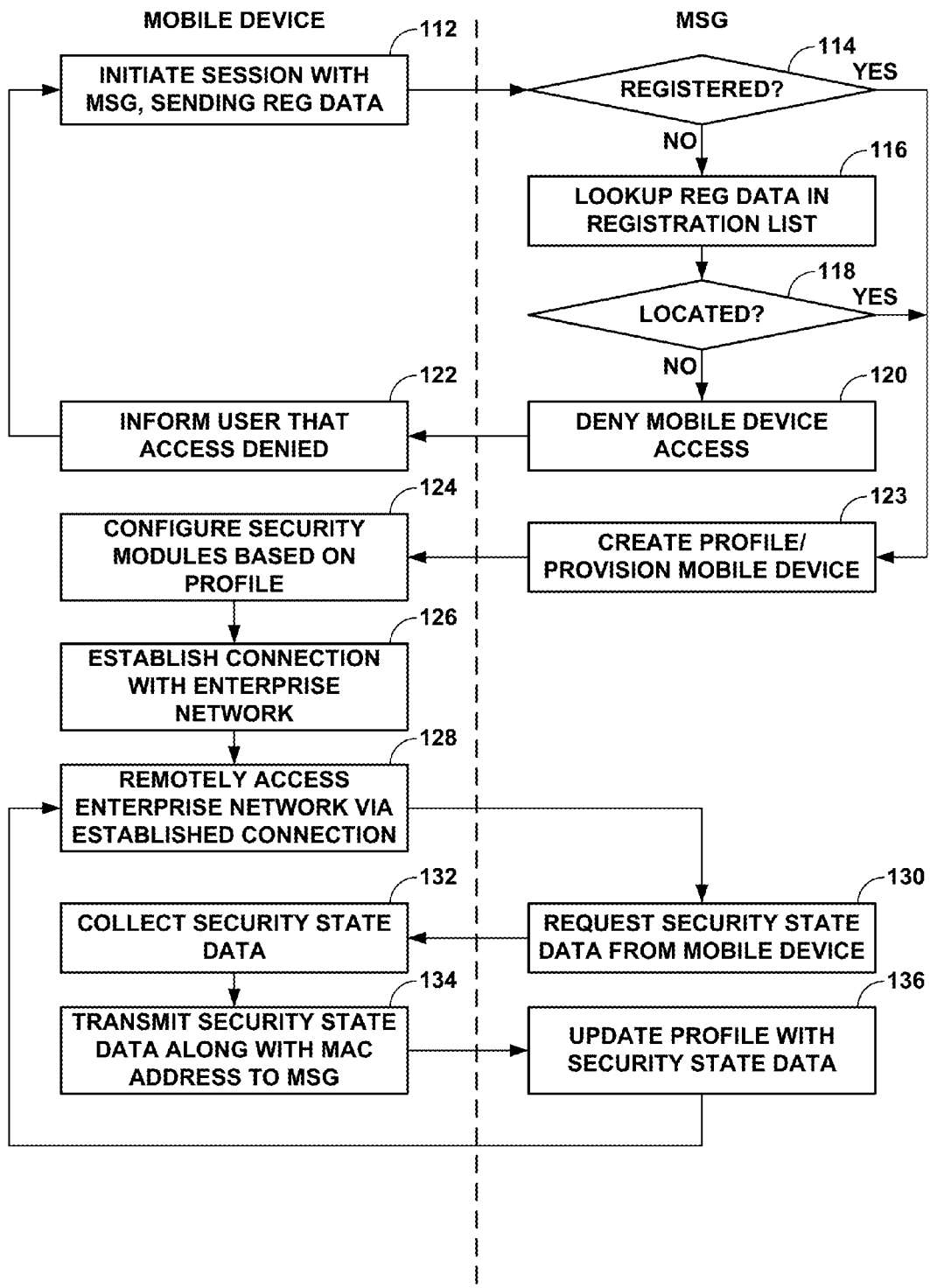
FIG. 3 is a flowchart illustrating an example operation of a mobile device when communicating with a mobile security gateway (MSG) to remotely access an enterprise network in accordance with the seamless L2 provisioning techniques described in this disclosure.

FIG. 3 is a flowchart illustrating an example operation of a mobile device, such as mobile device 18 shown in the examples of FIGS. 1 and 2A, when communicating with an mobile security gateway (MSG), such as MSG 22 shown in the examples of FIGS. 1 and 2A, in accordance with the seamless L2 provisioning techniques described in this disclosure.

Initially, security client module 44 may first initiate a session with MSG 22 by which to send one or more mobile identifiers (such as one or more of a phone number and an IMEI) and/or user identity credentials and/or enterprise or license code in the form of registration data 60 (112). Security server module 54 executed by control unit 52 of MSG 22 receives registration data 60 via the session and determines whether mobile device 18 has registered with security server module 54 (114).

Security server module 54 may, in some instances, pass a token back to mobile device 18 after registering module device 18, where mobile device 18 is to provide this token when establishing any subsequent sessions with MSG 22 so that MSG 22 can determine that mobile device 18 has already been registered. This token may also identify the one or more of enterprise networks 16 with which mobile device 18 is registered. Security server module 54 may then determine whether mobile device 18 has been previously registered based on whether or not mobile device 18 provides this token when establishing the session with MSG 22. In this instance, security client module 44 may store this token as a part of registration data 60. In other instances, mobile device 18 may register mobile device 18 each time mobile device 18 establishes a session with MSG 22 based on registration data 60.

In any event, assuming mobile device 18 has not yet registered with MSG 22 ("NO" 114), security server module 54 of MSG 22 attempts to register mobile device 18 based on the one or more mobile identifiers and/or user identity credentials provided by security client module 44 as registration data 60. That is, MSG 22 performs a lookup using the mobile identifiers provided as registration data 60 in one of registration lists 58 and/or validates the user identity credentials, and/or validates the license or enterprise code (116). If security server module 54 is unable to match mobile device 18 to any configurations, security server module 54 denies mobile device 18 access MSG 22 (118). Security server module 54 may transmit a message to security client module 44 of mobile device 18 indicating that access has been denied. Security client module 44 may inform user 45 that access has been denied via one or more of user interfaces 48 presented via user interface module 40 (120). User 45 may again attempt to establish the connection with MSG 22, repeating the process described above (potentially after contacting the information technology (IT) department to correct the registration issue with respect MSG 22) (112-118).

Assuming either that MSG 22 is able to register mobile device 18 based on registration data 60 ("YES" 118) or that mobile device 18 has already registered with MSG 22 ("YES" 114), MSG 22 then creates profile 61 associating mobile device 18 with configuration data 63 used to provision modules 42 executed by mobile device 18 and provisions mobile device 18 based on profile 61 (123). MSG 22 may transmit this configuration data 63 to mobile device 18 as a message via the session, whereupon mobile device 18 may receive this configuration data 63 and configure one or more of security modules 42 based on configuration data 63 of profile 61 (124).

Once registered and provisioned, mobile device 18 may proceed to establish a connection with enterprise network 16A (126). In some examples, mobile device 18 may establish more than one connection, where these connections may comprise various different types of connections, such as a VPN connection, a cellular service provider connection, a public network connection (such as provided by restaurants, coffee shops and the like as so-called "wireless hotspots"), a user network connection (such as that purchased by the user for home use), an enterprise network connection, or any other type of network connection. The user of mobile device 18 may enter authentication credentials, such as a username and password, to establish this connection. Mobile device 18 may then remotely access enterprise network 18A via the established connection 142 (128). Alternatively, mobile device 18 may provide security state data 130 to MSG 22 when changes to mobile security state data 130 occur. For example, when mobile device 18 detects a virus, mobile device 18 may report the virus to MSG 22 immediately without waiting for a periodic check-in.

At some time after provisioning mobile device 18, security server module 54 may request that security client module 44 provide security state data (130). This security state data may include virus reports detailing the detection and current state of viruses, anti-spam reports detailing spam email occurrences, firewall reports showing or otherwise detailing firewall activity, operating system version and status, state and other operating system information and any other information relevant to a security state of mobile device 18. This request may occur during a periodic check-in that mobile device 18 performs to update MSG 22 with any data relevant to its security state.

Security client module 44 of mobile device 18 collects security state data 64 and transmits security state data 64 along with MAC address 70 to MSG 22 in the manner described above (132, 134). This security state data 64 may include a timestamp at which it was provided to MSG 22 as well as any state data with regard to security modules 42, an operating system executing within mobile device 18 and any other component or module of mobile device 18, including data indicating recent authentication attempts. MAC address 70 may, as noted above, be assigned to or otherwise associated with wireless network interface 36 of mobile device 18 rather than cellular interface 34 even though mobile device 18 is currently, in this example, communicating with MSG 22 via cellular interface 34. MSG 22 receives security state data 64 and MAC address 70 via one of interfaces 50. Security server module 54 then updates profile 61 associated with MAC address 70 to store this security state data 64 (136). Mobile device 18 may then continue to remotely access enterprise network via the established connection, reporting its security state periodically or, alternatively, in response to a request by MSG 22, which continues to update profile 61 with security state data 64 (128-136). If the connection has timed out or otherwise expired, mobile device 18 may again establish the connection to enterprise network 16A, whereupon mobile device 18 may receive a different level of access to enterprise network 16A in view of security state data 64 published by MSG 22 in the manner described below in more detail with respect to FIGS. 4 and 5.

Figure 4:
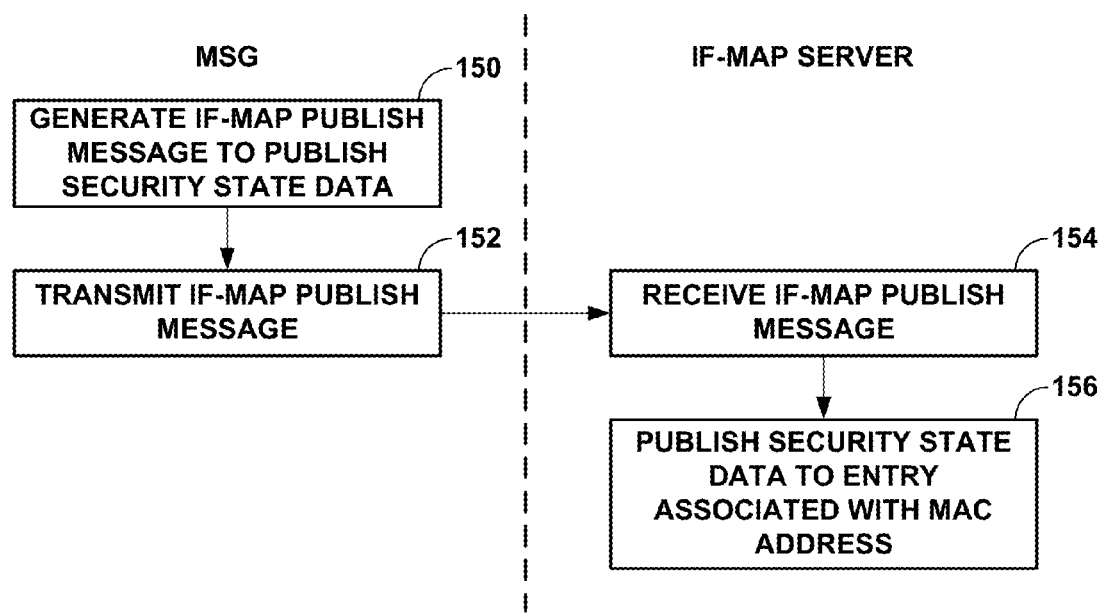
FIG. 4 is a flowchart illustrating a mobile security gateway (MSG) when publishing security state data to an enterprise security server in accordance with the techniques described in this disclosure.

FIG. 4 is a flowchart illustrating a mobile security gateway (MSG), such as MSG 22 shown in the examples of FIGS. 1 and 2B, when publishing security state data to an enterprise security server, such as IF-MAP server 28A shown in the examples of FIGS. 1 and 2B, in accordance with the techniques described in this disclosure. Typically, after receiving security state data 64, security server module 54 of MSG 22 publishes this security state data 64 to IF-MAP server 28A. If necessary, a hole in the firewall of enterprise network 16A is opened up by which MSG 22 may access IF-MAP server 28A without having to go through normal security channels that require MSG 22 to authenticate itself and establish its security state. In some instances, rather than publish security state data 64, security server module 54 publishes profile 61 in its entirety to IF-MAP server 28A.

To publish this security state data 64 to IF-MAP server 28A, security server module 54 invokes IF-MAP client module 72, passing security state data 64 and MAC address 70 to IF-MAP client module 72. IF-MAP client module 72 generates an IF-MAP publish message 74 in accordance with the IF-MAP protocol to publish security state data 64 (150). IF-MAP client module 72 transmits IF-MAP publish message 74 to IF-MAP server 28A (152) via one of interfaces 50. IF-MAP server 28A receives IF-MAP publish message 74 via one of interfaces 76, whereupon control unit 78 of IF-MAP server 28A invokes IF-MAP host module 82 to process IF-MAP publish message 74 in accordance with the IF-MAP protocol (154). IF-MAP host module 82 then publishes security state data 64 to an entry of IF-MAP database 80 associated with MAC address 70 in the manner described above (156).

Figure 5:
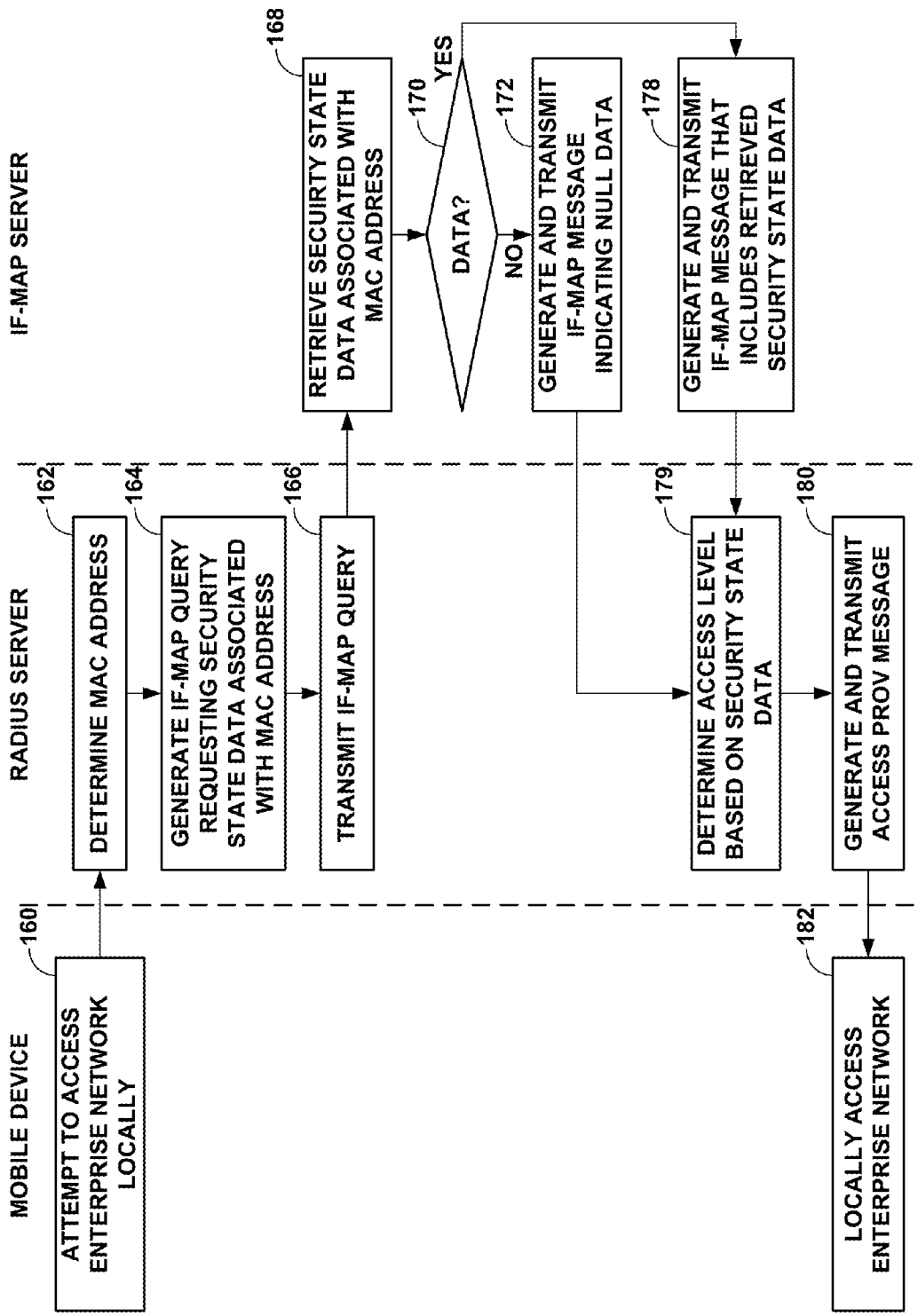
FIG. 5 is a flowchart illustrating exemplary operation of a mobile device, an authentication server and an enterprise security server when the mobile device attempts to seamlessly access enterprise network 16A locally in accordance with the techniques described in this disclosure.

FIG. 5 is a flowchart illustrating exemplary operation of a mobile device, such as mobile device 18 shown in the examples of FIGS. 1 and 2C, an authentication server, such as RADIUS server 26A shown in the examples of FIGS. 1 and 2C, and an enterprise security server, such as IF-MAP server 28A shown in the examples of FIGS. 1 and 2C, when the mobile device attempts to seamlessly access enterprise network 16A locally in accordance with the techniques described in this disclosure. As noted above, user 45 may travel from home, as one example, to work, where mobile device 18 transitions from connecting to service provider cellular network 12 to connecting to enterprise network 16A locally. Rather than require users in this situation to re-authenticate themselves prior to permitting local access to enterprise network 16A, which may dissuade users from utilizing the local connection, the techniques described in this disclosure may provide for seamless L2 provisioning from the perspective of the user.

Upon detecting that mobile device 18 is local to enterprise network 16A in the manner described above, security client module 44 executed by control unit 38 of mobile device 18 may attempt to locally access enterprise network 16A using wireless network interface 36 rather than using cellular interface 34 (160). In attempting to access enterprise network 16A locally, mobile device 18 communicates with WAP 24A in the manner described above. WAP 24A may then issue a RADIUS Access message in the manner described above to RADIUS server 26A. This RADIUS Access message may include the MAC address of the wireless interface of mobile device 18 (i.e., MAC address 70 in this example) in the form of a RADIUS attribute appended to the RADIUS access message. RADIUS server 26A may receive this RADIUS access message from WAP 24A requesting access on behalf of mobile device 18 and parse the RADIUS access message to determine MAC address 70 (162). RADIUS server 26A may then invoke authentication module 96 to authenticate MAC address 70. Authentication module 96 then invokes IF-MAP client module 94 to retrieve any security state data associated with MAC address 70 in IF-MAP server 28A.

After being invoked, IF-MAP client module 94 receives MAC address 70 from authentication module 96. IF-MAP client module 94 generates an IF-MAP query 102 requesting any security state data associated with MAC address 70 (164). IF-MAP client module 94 transmits this IF-MAP query 102 to IF-MAP server 28A (166). IF-MAP host module 82 of control unit 78 receives this IF-MAP query 102 via one of interfaces 76. In response to receiving query 102, IF-MAP host module 82 parses MAC address 70 from IF-MAP query 102. IF-MAP host module 82 then retrieves any security state data associated with MAC address 70 by formulating a query to IF-MAP database 80 requesting any security state data associated with MAC address 70 (168). If IF-MAP host module 82 determines that IF-MAP database 80 does not store any security state data associated with MAC address 70 ("NO" 170), IF-MAP host module 82 generates and transmits an IF-MAP message indicating null data (172), which effectively indicates to RADIUS server 26A that mobile device 18 has not previously registered with MSG 22.

IF-MAP host module 94 may return this null response to IF-MAP client module 94 of RADIUS server 26A, which then proceeds to pass this response to access provisioning module 98 of RADIUS server 26A. Access provisioning module 98 may, in these instances, only grant limited access to mobile device 18 such that mobile device 18 may only access MSG 22 but not the rest of enterprise network 16A. Alternatively, access provisioning module 98 may determine that mobile device 18 should receive no access. In any event, access provisioning module 98 determines an access level based on security state data 64 or a lack thereof (179). Access provisioning module 98 may then generate and transmit access provisioning message 106 identifying an access level granted to mobile device 18 (which may be no access or limited access in this instance) (180). WAP 24A may receive this message and either generate and transmit a RADIUS reject message (when no access is granted) or a RADIUS accept message (when limited access is granted). Assuming that limited access is granted, mobile device 18 may then locally access enterprise network 16A. WAP 24A may enforce the access level granted to mobile device 18, preventing mobile device 18 from accessing anything but MSG 22.

If, however, IF-MAP database 80 returns, in this example, security state data 64 to IF-MAP host module 94 in response to the query ("YES" 170), IF-MAP host module 94 generates and transmits an IF-MAP message 104 to RADIUS server 28A that includes retrieved security state data 64 (178). In response to receiving this IF-MAP message 104 via one of interfaces 84, IF-MAP client module 94 passes security state data 64 to access provisioning module 98. Access provisioning module 98 may then apply access policies 92 to security state data 64 to determine a level of access to enterprise network 16A permitted to mobile device 18, which may also be referred to as an access level. In this way, access provisioning module 98 determines an access level based on retrieved security state data 64 (179). In some instances, access provisioning module 98 may determine that security state data 64 has expired based on the timestamp that identifies when this security state data 64 was last provided to MSG 22. In these instances, access provisioning module 98 may determine that mobile device 18 receives a restricted level of access that only permits access to MSG 22 and not enterprise network 16A. Mobile device 18 may receive from WAP 24A a message indicating that access has been restricted and security client module 44 may establish a session with MSG 22 so as to provide a current version of security state data 64.

Access provisioning module 98 may, in this instance, generate an access provisioning message 106 that identifies determined access level, which may indicate whether or not mobile device 18 has any access, very-limited access (such as to MSG 22 only), access to the Internet but no local networks, full access to all networks (both enterprise networks and Internet, as one example) access to selected resources based on the user's identity and security state data 64, or any other possible level of access based on any data, such as profile 61, that may be published to IF-MAP server 28A by MSG 22. Access provisioning module 98 then transmits this access provisioning message 106 to WAP 24A, which proceeds to grant or reject access to enterprise network 16A by mobile device 18 based on the determined access level. Mobile device 18 may then, assuming some level of access was granted, locally access enterprise network 16A without the user having to re-authenticate before accessing enterprise network 16A. In this manner, mobile device 18 may seamlessly access enterprise network locally based on the determined access level (182).

While described above as publishing this security state data upon receiving this data from the mobile device, MSG 22 may not publish this data immediately. In some instances, MSG 22 may store this security state data locally in a database or other storage device or unit. In these instances, the RADIUS server may issue a request-for-investigation to the IF-MAP server.

This request-for-investigation may specify the MAC address associated with the wireless interface of the mobile device. The IF-MAP server may then notify MSG 22 of this request-for-investigation, where MSG 22 publishes the security state data it stores locally to the IF-MAP server in response to this notification. In this sense, the RADIUS server pulls this information from MSG 22 rather than, in the above examples, MSG 22 pushing this data to the IF-MAP server. In these instances where the RADIUS server pulls this data from MSG 22 via the IF-MAP server, MSG 22 may refresh its assessment of the mobile device during authentication by the RADIUS server via a connection over the cellular service provider network (e.g., by using SMS messages and IP over the carrier network). In this way, MSG 22 may provide updated security state data over this pull model in comparison to the push model where such data may have been pushed at much earlier time.

In addition, mobile device 18 may periodically check in with MSG 22 to report security state data 64 or any other changes to profile 61, as described above. MSG 22 may therefore periodically update security state data 64 and/or profile 61 as published to IF-MAP server 28A. Alternatively, RADIUS server 26A may publish a request-for-information to those entries of IF-MAP server 28A that it desires to have up-to-date security state data. IF-MAP server 28A may then notify MSG 22 of this request-for-information, whereupon MSG 22 may request updated security state data 64 in the manner described above. In this way RADIUS server 26A may publish the request-for-information so as to provoke MSG 22 to obtain and publish updated security state data 64.

IF-MAP server 28A may feature the above described push model to push updates to this security state data 64 to RADIUS server 26A. RADIUS server 26A may then, in response to receiving notification that security state data 64 has changed, retrieve security state data 64 (as updated) and invoke access provisioning module 98 to access this updated security state data 64. Access provisioning module 98 may apply access policies 92 to updated security state data 64 with the result being that access provisioning module 98 may determine a new level of access for mobile device 18 without mobile device 18 even attempting to request access again to enterprise network 16A. In effect, access provisioning module 98 may perform a form of on-demand access provisioning in response to updates of security state data 64 published to IF-MAP server 28A. Access provisioning module 98 may then generate and transmit another access provisioning message 106 granting mobile device 18 this new level of access. WAP 24A may then enforce this new level of access, often times, without the user of mobile device 18 even being aware of this new level of access considering that it all occurs transparently from the perspective of the user of mobile device 18.

To illustrate this aspect of the techniques, consider that mobile device 18, while locally connected to enterprise network 16A via WAP 24A, contracts a virus. AV module 42A may detect this virus but not remove the virus. In response to detecting the virus, AV module 42A may interface with security client module 44 to update security state data 64. In response to updating security state data 64, security client module 44 may detect the update and establish a session with MSG 22 to report the update security state data 64. MSG 22 may publish this updated security state data 64 to IF-MAP server 28A, which may issue a notification to RADIUS server 26A informing RADIUS server 26A that security state data 64 associated with mobile device 18 (i.e., MAC address 70 in this example) has been updated. RADIUS server 26A may retrieve this updated security state data 64 and determine a new level of access that restricts mobile device 18 to a quarantine network (which may represent a small network within enterprise network 16A isolated from the remaining portions of enterprise network 16A. In this manner, RADIUS server 26A may restrict the level of access granted to mobile device 18 so as to prevent the virus from spreading.

When the virus has been successfully removed, mobile device 18 may report this removal as updated security state data 64 to MSG 22. MSG 22 may publish this updated security state data 64 to IF-MAP server 28A, which then issues a notification to RADIUS server 26A stating that security state data 64 associated with mobile device 18 has been updated. RADIUS server 26A may then retrieve this updated security state data and invoke access provisioning module 98 to determine a potentially new level of access (which is new in comparison to the current level of access granted to mobile device 18 and not necessarily new in the sense that mobile device 18 has never received this level of access before). RADIUS server 26A may then generate and transmit another access provisioning message granting mobile device 18 this new level of access. WAP 24A may then enforce this new level of access. Assuming the virus was successfully removed, this new level of access may enable mobile device 18 to access enterprise network 16A rather than just the quarantine network. This level of access is most likely the same as that granted to mobile device 18 prior to contracting the virus. In any event, this form of dynamic access provisioning may automate various aspects of network security and thereby reduce administrative burdens associated with administering mobile devices. Moreover, the techniques may reduce virus spread and otherwise prevent insecure or instable devices access to enterprise network 16 based on a given enterprise's security policies.

Various embodiments of the invention have been described. These and other embodiments are within the scope of the following claims.

The invention claimed is:

1. A method comprising:
   establishing, with a network device positioned in a public network, a session with a mobile device via a first interface of the mobile device;
   requesting, with the network device, security state data identifying a security state of the mobile device via the established session;
   receiving, with the network device, a mobile device identifier and the security state data from the mobile device via the session, wherein the mobile device identifier identifies the mobile device, wherein the mobile device identifier identifies a second interface of the mobile device that is used for communicating with a private network; and
   publishing the security state information to a database securely accessible by an authentication device positioned in the private network such that the security state information is associated with the mobile device identifier and enables automatic authentication of the mobile device by the authentication device when the mobile device connects to the private network via the second interface prior to establishing a layer three session with the private network.

2. The method of claim 1, further comprising:
   determining configuration data to configure one or more security modules executing on the mobile device, wherein the configuration data specifies whether one or more security features provided by the one or more security modules executing on the mobile device are enabled, and wherein the security features include one or more of anti-virus, anti-malware, anti-spam, firewall, theft protection, and monitor and control security features; and transmitting the configuration data to the mobile device via the session to configure the one or more security modules executing on the mobile device to enable those of the security features identified by the configuration data.

3. The method of claim 1, further comprising:
determining whether the mobile device has previously registered with the network device;
in response to determining that the mobile device has not previously registered with the network device, creating a profile for the mobile device identified by the mobile device identifier;
determining configuration data to configure one or more security modules executing on the mobile device, wherein the configuration data specifies whether one or more security features provided by the one or more security modules executing on the mobile device are enabled;
transmitting the configuration data to the mobile device via the session to configure the one or more security modules executing on the mobile device to enable those of the security features identified by the configuration data;
storing the configuration data to the profile;
storing the security state data to the profile; and
publishing the profile to the database.

4. The method of claim 2, further comprising transmitting 802.1X configuration settings to the mobile device via the session to configure an 802.1X supplicant module on the mobile device,
wherein the profile published to the database includes information describing the 802.1X configuration settings, and
wherein the information describing the 802.1X configuration settings comprises one or more of an identifier of an X.509 certificate and a username.

5. The method of claim 1,
wherein the first interface comprises a wireless network interface,
wherein the second interface comprises a cellular interface, and
wherein the mobile device identifier comprises a layer 2 address associated with the wireless network interface of the mobile device that is different from the cellular interface of the mobile device used to communicate with the public network.

6. The method of claim 1, further comprising:
receiving registration information from the mobile device via the public network, wherein the registration information registers the mobile device with the network device; and
registering the mobile device with the network device based on the registration information,
wherein requesting security state data comprises, after successfully registering the mobile device with the network device, requesting the security state data identifying the security state of the mobile device.

7. The method of claim 1, further comprising:
prior to establishing the layer three session with the private network, receiving, with an authentication device, an authentication request from a wireless access point in an attempt by the wireless access point to authenticate the mobile device to locally access the private network wirelessly;
based on the authentication request, determining the mobile device identifier that identifies the mobile device with the authentication device;
retrieving the security state data associated with the determined mobile device identifier from the database;
determining, with the authentication device, a level of access to the private network permitted to the mobile device based on the retrieved security state data; and
prior to establishing the layer three session with the private network, transmitting the level of access to the wireless access point so that the wireless access point enforces, with respect to communications sent to and received from the mobile device, the level of access determined by the authentication device.

8. The method of claim 7, further comprising publishing, with the authentication device, a request-for-information to the database so as to provoke the network device to obtain and publish updated security state data.

9. A network device located in a public network, the network device comprising:
at least one interface that establishes a session with a mobile device via a first interface of the mobile device; and
a control unit that requests security state data identifying a security state of the mobile device via the established session,
wherein the at least one interface receives a mobile device identifier and the security state data from the mobile device via the session, wherein the mobile device identifier identifies a second interface of the mobile device that is used for communicating with a private network, and
wherein the control unit publishes the security state information to a database securely accessible by an authentication device positioned in the private network such that the security state information is associated with the mobile device identifier and enables automatic authentication of the mobile device when the mobile device connects to the private network via the second interface prior to establishing a layer three session with the private network.

10. The network device of claim 1,
wherein the control unit further determines configuration data to configure one or more security modules executing on the mobile device, wherein the configuration data specifies whether one or more security features provided by the one or more security modules executing on the mobile device are enabled, and wherein the security features include one or more of anti-virus, anti-malware, anti-spam, firewall, theft protection, and monitor and control security features; and
wherein the at least one interface transmits the configuration data to the mobile device via the session to configure the one or more security modules executing on the mobile device to enable those of the security features identified by the configuration data.

11. The network device of claim 1,
wherein the control unit further determines whether the mobile device has previously registered with the network device, in response to determining that the mobile device has not previously registered with the network device, creates a profile for the mobile device identified by the mobile device identifier, and determines configuration data to configure one or more security modules executing on the mobile device, wherein the configuration data specifies whether one or more security features provided by the one or more security modules executing on the mobile device are enabled, and
wherein the at least one interface transmits the configuration data to the mobile device via the session to configure the one or more security modules executing on the mobile device to enable those of the security features identified by the configuration data, and
wherein the control unit stores the configuration data to the profile, stores the security state data to the profile, and publishes the profile to the database.

12. A non-transitory computer-readable medium comprising instructions that, when executed, cause one or more processors to:
establish, with a network device positioned in a public network, a session with a mobile device via a first interface of the mobile device;
request, with the network device, security state data identifying a security state of the mobile device via the established session;
receive, with the network device, a mobile device identifier and the security state data from the mobile device via the session, wherein the mobile device identifier identifies a second interface of the mobile device that is used for communicating with a private network; and
publish the security state information to a database securely accessible by an authentication device positioned in the private network such that the security state information is associated with the mobile device identifier and enables automatic authentication of the mobile device by the authentication device when the mobile device connects to the private network via the second interface prior to establishing a layer three session with the private network.

13. A method comprising:
prior to establishing a layer three session with a mobile device, receiving, with an authentication device, an authentication request from a wireless access point in an attempt by the wireless access point to authenticate the mobile device to locally access a private network wirelessly;
based on the authentication request, determining, with the authentication device, a mobile device identifier that identifies a second interface of the mobile device used to communicate with the private network;
retrieving security state data associated with the determined mobile device identifier from the database, the security state data provided by the mobile device when positioned in a public network via a first interface of the mobile device;
determining, with the authentication device, a level of access to the private network permitted to the mobile device based on the retrieved security state data; and
prior to establishing the layer three session with the mobile device, transmitting the level of access to the wireless access point so that the wireless access point enforces, with respect to communications sent to and received from the mobile device, the level of access determined by the authentication device.

14. The method of claim 13,
wherein the database is accessed using interface for metadata access point (IF-MAP), and
wherein retrieving security state data comprises:
generating an IF-MAP query formulated in accordance with the IF-MAP specification that requests any security state data associated with the determined MAC address;
transmitting the IF-MAP query to the IF-MAP database; and
receiving an IF-MAP message in response to the IF-MAP query providing the security state data associated with the determined MAC address.

15. The method of claim 14, further comprising publishing, with the authentication device, a request-for-information to the database so as to provoke a network device to obtain and publish updated security state data.

16. The method of claim 14, further comprising:
subscribing, with the authentication device, to the database for changes to the updated security state data;
in response to changes to the updated security state data, determining, with the authentication device, a new level of access; and
transmitting the new level of access to the wireless access point so that the wireless access point enforces, with respect to communications sent to and received from the mobile device, the new level of access determined by the authentication device.

17. The method of claim 13, further comprising:
retrieving, with the authentication device, a profile created by the network device from the database that associates the mobile device identifier with the security state data and configuration data used to configure one or more security modules executing on the mobile device, wherein the configuration data specifies whether one or more security features provided by the one or more security modules executing on the mobile device are enabled; and
determining, with the authentication device, the level of access to the private network permitted to the mobile device based on the retrieved profile.

18. An authentication device comprising:
at least one interface configured to, prior to establishing a layer three session with a mobile device, receive an authentication request from a wireless access point in an attempt by the wireless access point to authenticate the mobile device to locally access a private network wirelessly; and
a control unit configured to, based on the authentication request, determine a mobile device identifier that identifies a second interface of the mobile device used to communicate with the private network, retrieve security state data associated with the determined mobile device identifier from the database, the security state data provided by the mobile device when positioned in a public network via a first interface of the mobile device, determine, with the authentication device, a level of access to the private network permitted to the mobile device based on the retrieved security state data,
wherein the at least one interface is further configured to, prior to establishing the layer three session with the mobile device, transmit the level of access to the wireless access point so that the wireless access point enforces, with respect to communications sent to and received from the mobile device, the level of access determined by the authentication device.

19. The authentication device of claim 18, wherein the control unit publishes a request-for-information to the database so as to provoke the wireless access point to obtain and publish updated security state data.

20. The authentication device of claim 19,
wherein the control unit of the authentication device further subscribes to the database for changes to the updated security state data and, in response to changes to the updated security state data, determines a new level of access, and wherein the at least one interface of the authentication device transmits the new level of access to the wireless access point so that the wireless access point enforces, with respect to communications sent to and received from the mobile device, the new level of access determined by the authentication device.

21. The authentication device of claim 18, wherein the control unit retrieves a profile created by the wireless access point from the database that associates the mobile device identifier with the security state data and configuration data used to configure one or more security modules executing on the mobile device, wherein the configuration data specifies whether one or more security features provided by the one or more security modules executing on the mobile device are enabled and determines the level of access to the private network permitted to the mobile device based on the retrieved profile.

22. A non-transitory computer-readable storage medium having stored thereon instructions that, when executed, cause one or more processors to:

prior to establishing a layer three session with a mobile device, receive an authentication request from a wireless access point in an attempt by the wireless access point to authenticate the mobile device to locally access a private network wirelessly;

based on the authentication request, determine a mobile device identifier that identifies a second interface of the mobile device used to communicate with the private network;

retrieve security state data associated with the determined mobile device identifier from the database, the security state data provided by the mobile device when positioned in a public network via a first interface of the mobile device;

determine a level of access to the private network permitted to the mobile device based on the retrieved security state data; and prior to establishing the layer three session with the mobile device, transmit the level of access to the wireless access point so that the wireless access point enforces, with respect to communications sent to and received from the mobile device, the determined level of access.

\* \* \* \* \*